US009769768B2

(12) United States Patent
Rao

(10) Patent No.: US 9,769,768 B2
(45) Date of Patent: Sep. 19, 2017

(54) METHOD AND APPARATUS FOR REDUCING INTERFERENCE IN A HETEROGENEOUS NETWORK

(71) Applicant: Alcatel-Lucent USA Inc., Murray Hill, NJ (US)

(72) Inventor: Anil M Rao, Redmond, WA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 156 days.

(21) Appl. No.: 14/265,993

(22) Filed: Apr. 30, 2014

(65) Prior Publication Data
US 2015/0319710 A1 Nov. 5, 2015

(51) Int. Cl.
*H04W 52/24* (2009.01)
*H04W 72/04* (2009.01)
*H04L 5/00* (2006.01)
*H04W 24/02* (2009.01)

(52) U.S. Cl.
CPC ......... *H04W 52/244* (2013.01); *H04L 5/0032* (2013.01); *H04L 5/0053* (2013.01); *H04L 5/0073* (2013.01); *H04W 72/042* (2013.01); *H04W 24/02* (2013.01)

(58) Field of Classification Search
CPC ............. H04W 52/244; H04W 72/042; H04W 52/143; H04L 5/0032; H04L 5/0053; H04L 5/0073; H02W 24/02
USPC ....................................................... 370/329
See application file for complete search history.

(56) References Cited

U.S. PATENT DOCUMENTS

| 2010/0056197 | A1* | 3/2010 | Attar | H04L 1/0026 455/522 |
| 2010/0323745 | A1* | 12/2010 | Chen | H04W 52/325 455/522 |
| 2011/0194524 | A1* | 8/2011 | Hedlund | H04L 5/0053 370/329 |
| 2012/0115485 | A1* | 5/2012 | Narasimha | H04W 68/02 455/437 |
| 2012/0289270 | A1* | 11/2012 | Huang | H04W 52/242 455/509 |
| 2013/0033998 | A1* | 2/2013 | Seo | H04W 24/00 370/252 |
| 2013/0188594 | A1* | 7/2013 | Cesar | H04W 72/082 370/329 |
| 2014/0045510 | A1* | 2/2014 | Yue | H04W 72/042 455/450 |

(Continued)

FOREIGN PATENT DOCUMENTS

WO  WO 2011085191 A1 *  7/2011  ......... H04L 5/0053

*Primary Examiner* — Jeffrey M Rutkowski
*Assistant Examiner* — Shah Rahman
(74) *Attorney, Agent, or Firm* — Duft Bornsen & Fettig, LLP

(57) ABSTRACT

Various methods and devices are provided to address the need for reducing interference in heterogeneous wireless networks. In one apparatus, a network node (500) that includes a transceiver (502) and a processing unit (501) is provided. The processing unit is configured to transmit, via the transceiver, downlink signaling at a primary power spectral density (PSD) level and to also transmit, via the transceiver, a group of control channel elements (CCEs) on a physical downlink control channel (PDCCH) at a reduced PSD level, the reduced PSD level being less than the primary PSD level.

20 Claims, 5 Drawing Sheets

(56) References Cited

U.S. PATENT DOCUMENTS

| | | | |
|---|---|---|---|
| 2014/0079009 A1* | 3/2014 | Liu | H04W 8/26 370/329 |
| 2014/0161056 A1* | 6/2014 | Moulsley | H04W 72/042 370/329 |
| 2014/0334397 A1* | 11/2014 | Chen | H04W 72/042 370/329 |
| 2015/0146679 A1* | 5/2015 | Lindoff | H04B 1/7103 370/330 |

* cited by examiner

METHOD AND APPARATUS FOR REDUCING INTERFERENCE IN A HETEROGENEOUS NETWORK

FIELD OF THE INVENTION

The present invention relates generally to communications and, in particular, to reducing interference in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

3GPP LTE (Long Term Evolution) uses the Physical Downlink Control Channel (PDCCH) in the downlink to issue scheduling decisions for uplink and downlink transmissions. For uplink transmissions, the information sent on the PDCCH informs which mobiles are allowed to send packet data transmissions on the physical uplink shared channel (PUSCH), and for downlink transmissions the PDCCH informs particular mobiles that data will be sent to them on the physical downlink shared channel (PDSCH). Proper reception of the PDCCH is crucial for proper operation of the LTE air interface, which relies exclusively on the shared channel concept. That is, because users must share a common channel for their transmissions, it is crucial that users receive information regarding when they are allowed to transmit in the uplink or when they will be receiving information in the downlink.

The PDCCH was designed in the LTE standard to work properly in a reuse-1 environment; that is, it was designed to be able to properly reach mobiles located at the edge of the cell where the signal to interference plus noise ratio (SINR) may be quite low, say −5 dB. A PDCCH transmission is done using a set of control channel elements (CCEs), and the LTE standard allows the aggregation of 1, 2, 4, or 8 CCEs which allows lower coding rates for the information transmitted on the PDCCH while consuming a larger amount of bandwidth to transmit the message. The highest aggregation level allowed is aggregation level 8, which allows approximately $10*\log 10(8)=9$ dB lower SINR to be experienced on the PDCCH compared to the case of no aggregation being used.

However, new scenarios are now being considered to enhance overall LTE system performance through the introduction of small cells which are located near areas of high traffic density within a macro-cellular network, and which transmit at a low power level, say 16 dB below a normal macro cell base station, as illustrated in diagram 100 of FIG. 1. Such a deployment of cells is referred to as a heterogeneous network. Cell association biases are introduced in these heterogeneous networks to allow the coverage of the small cells to be extended to allow overall improved system performance; however, this can create a very poor interference condition in the downlink.

For example, if the cell selection bias used in this heterogeneous network is modified such that a mobile connects to the cell for which it measures the smallest path loss (i.e., closest radio distance), then a mobile, which is connected to the low power small cell and is located at the border of the small cell coverage area and the macro cell coverage area, will receive downlink transmissions from the high-power macro cell which is at a much higher power level (equal to the difference in transmit power between the macro cell and the small cell, potentially 16 dB stronger) than the downlink transmissions from the small cell, as illustrated in diagram 200 of FIG. 2. Because the mobile is connected to the small cell, the high power macro cell is considered interference; this means the cell edge SINR may be nearly 16 dB lower than experienced in existing homogenous networks.

This creates a problem for PDCCH reception on the downlink, as the existing aggregation levels in the standard are not designed to handle such a low SINR condition at the edge of the cell. Therefore, the need exists for new techniques that improve the operation of the crucial PDCCH in these high interference conditions.

Figure 1:
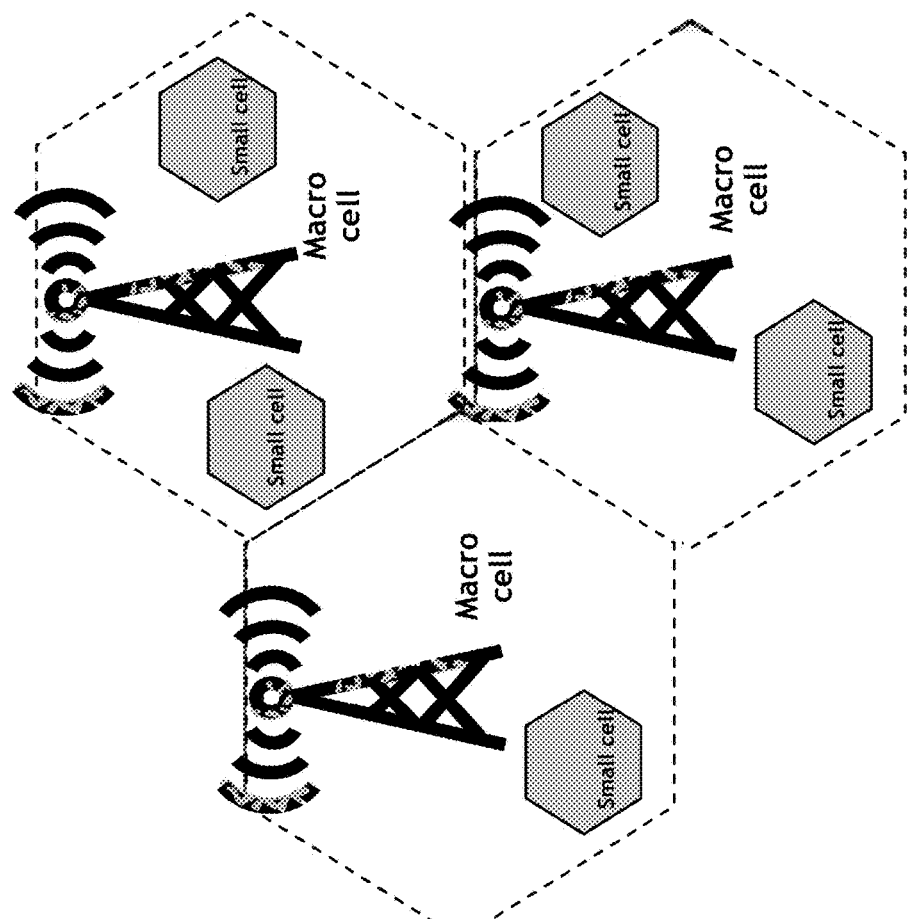
FIG. 1 is a block diagram depiction of a wireless network in which low power small cells are placed within higher power macro cells.
Figure 2:
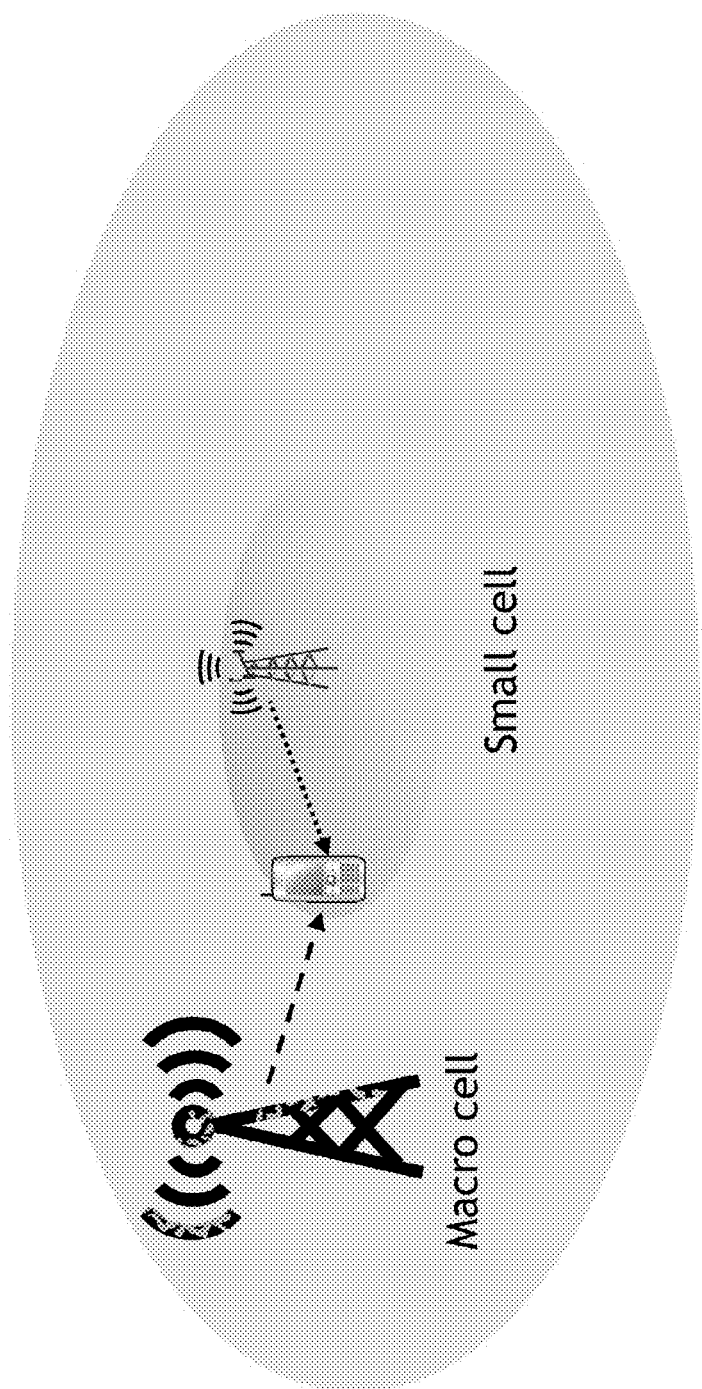
FIG. 2 is a block diagram depiction of a mobile at the edge of a small cell coverage area.

Specific embodiments of the present invention are disclosed below with reference to FIGS. 1-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY

Various methods and devices are provided to address the need for reducing interference in heterogeneous wireless networks. In one method, a network node transmits downlink signaling at a primary power spectral density (PSD) level. The network node also transmits a group of control channel elements (CCEs) on a physical downlink control channel (PDCCH) at a reduced PSD level, the reduced PSD level being less than the primary PSD level. An article of manufacture is also provided, the article comprising a non-transitory, processor-readable storage medium storing one or more software programs which when executed by one or more processors performs the steps of this method.

Many embodiments are provided in which the method above is modified. For example, depending on the embodiment, the network node may be either a small cell network node or a macro cell network node. In most of the embodiments in which the network node is a macro cell network node, a coverage area of the macro cell network node overlaps with a coverage area of a small cell network node. In addition, resource element groups (REGs) of the PDCCH are aligned with PDCCH REGs of the small cell network node (or aligned to a maximum extent allowed by system configuration parameters).

Depending on the embodiment, the reduced PSD level is the primary PSD level reduced by a difference in transmit power between the macro cell network node and the small cell network node. Also, in some embodiments, the small cell network node transmits downlink signaling at a small cell primary PSD level and also transmits a small cell group of CCEs on a small cell PDCCH at a small cell reduced PSD level, which is less than the small cell primary PSD level. In addition, the small cell group of CCEs does not overlap with the group of CCEs transmitted at a reduced PSD level by the macro cell network node.

A network node apparatus that includes a transceiver and a processing unit, communicatively coupled to the transceiver, is also provided. The processing unit is configured to transmit, via the transceiver, downlink signaling at a primary power spectral density (PSD) level and to also transmit, via the transceiver, a group of control channel elements (CCEs) on a physical downlink control channel (PDCCH) at a reduced PSD level, the reduced PSD level being less than the primary PSD level.

Many embodiments are provided in which this network node apparatus is modified. For example, depending on the embodiment, the network node may be either a small cell network node or a macro cell network node. In most of the embodiments in which the network node is a macro cell network node, a coverage area of the macro cell network node overlaps with a coverage area of a small cell network node. In addition, resource element groups (REGs) of the PDCCH are aligned with PDCCH REGs of the small cell network node (or aligned to a maximum extent allowed by system configuration parameters). Depending on the embodiment, the reduced PSD level is the primary PSD level reduced by a difference in transmit power between the macro cell network node and the small cell network node.

DETAILED DESCRIPTION OF EMBODIMENTS

Figure 3:
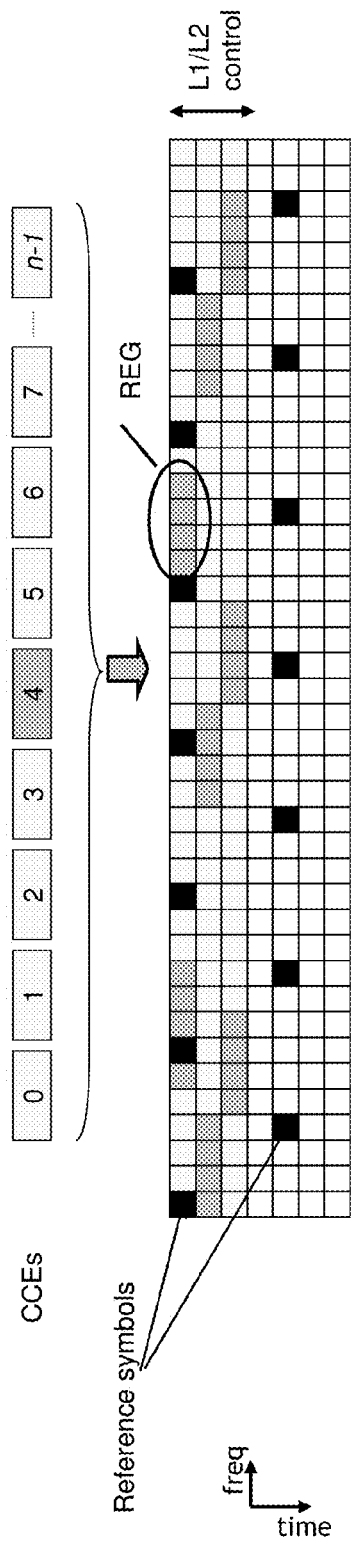
FIG. 3 is a block diagram depiction of an example PDCCH design through the use of CCEs (a mapping of CCE 4 to resource elements is shown as an example).
Figure 4:
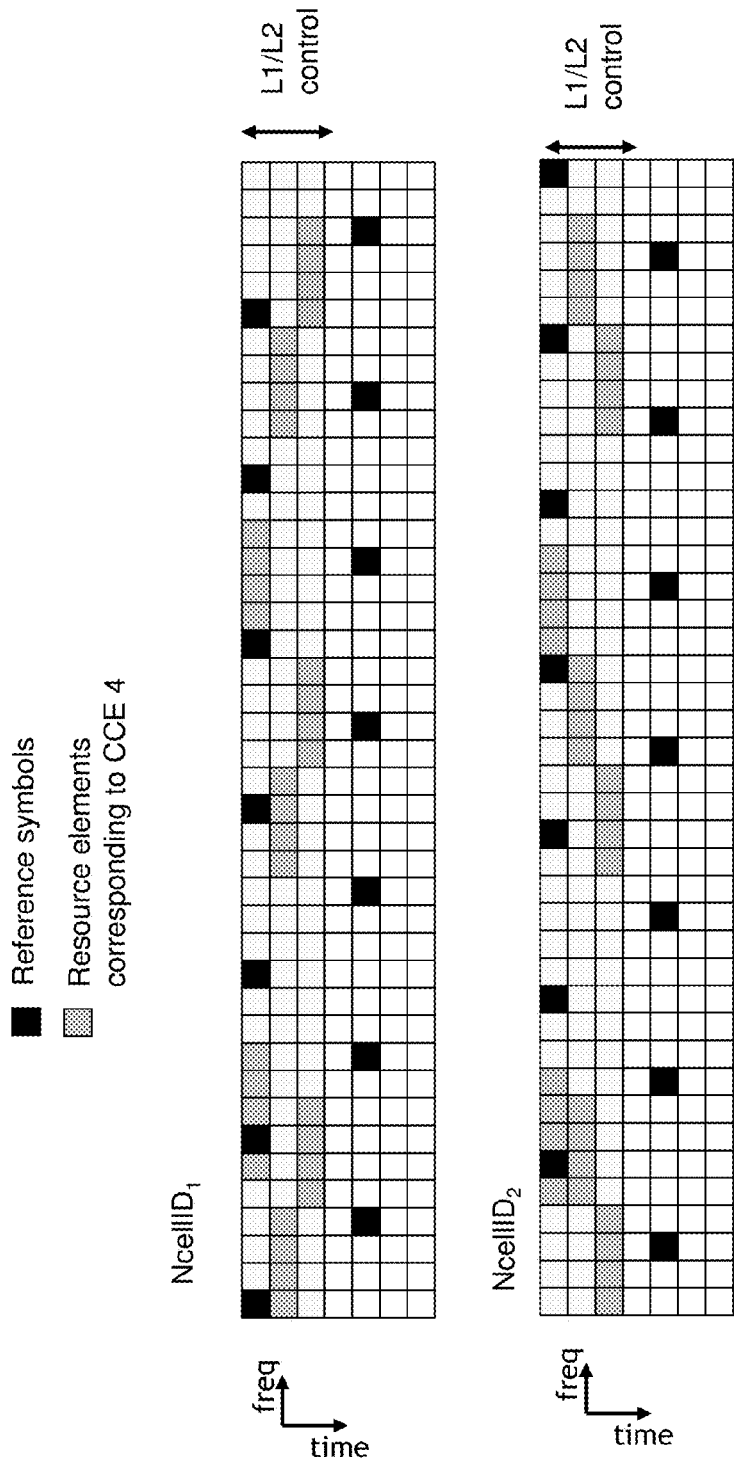
FIG. 4 is a block diagram depiction of resource element misalignment (corresponding to a particular CCE index) between two cells with different physical layer cell IDs.

To provide a greater degree of detail in making and using various aspects of the present invention, a description of our approach to reducing interference and a description of certain, quite specific, embodiments follows for the sake of example. FIGS. 3 and 4 are referenced in an attempt to explain some examples of specific embodiments of the present invention.

In general, what is proposed is a control channel element (CCE) planning technique on the PDCCH in order to alleviate the high interference. As will be described, the CCE planning technique involves careful selection of the cell IDs used for the cells in the heterogeneous network.

As illustrated by diagram 300 of FIG. 3, a PDCCH transmission consists of a number of CCEs (1, 2, 4 or 8), where each CCE consists of 9 resource element groups (REGs), and each REG consists of 4 consecutive useful resource elements (REs). (REs are also referred to as tones in an OFDM system.) The REGs within a CCE are distributed in frequency and over the first n=1, 2, or 3 OFDM symbols in an LTE subframe (an LTE subframe consists of a total of 14 OFDM symbols). The REGs are distributed in frequency over the entire LTE carrier bandwidth (for example a 10 MHz carrier) in order to achieve frequency diversity.

We say a REG consists of 4 consecutive useful REs because there are downlink common reference symbols (CRS) located in fixed positions shown in black in diagram 300, and the exact location of these CRSs depend on the physical layer cell ID which is assigned when the cell is put into operation. The position of the CRS cannot change, and hence a REG has to "step around" a CRS when the starting position of the REG does not have 4 actual consecutive REs available. There are also two other physical channels not shown in FIG. 3, called the physical common format indicator channel (PCFICH) and the physical hybrid automatic repeat request indicator channel (PHICH) which have fixed positions depending the physical layer cell ID and which the REs within a REG also have to step around. In addition, there is scrambling of the information content sent on the PDCCH based on the physical layer cell ID. This allows all CCEs to be used in each cell (i.e., allows reuse factor 1).

In our approach to reducing interference, we propose restricting the transmit power spectral density (PSD) level for PDCCH transmissions which use a subset of CCEs in the high-power macro cell, so as to generate significantly less interference over that set of CCEs in the low-power small cell. As an extreme, we could restrict transmit PSD to zero, meaning those CCEs are not allowed to be used in the high power macro cell. A more practical choice would be to reduce the transmit PSD level by an amount equal to the power difference between the macro cell and small cell. For example, if the macro cell maximum amplifier power is 46 dBm (40 Watts) and the small cell transmission power is 30 dBm (1 Watt), then we would place a restriction that the transmit PSD over the power restricted set of CCEs in the macro cell be reduced by 16 dB. This would make the received power from the macro cell and the small cell to be approximately the same as in a homogenous network at the cell boundary of the small cell over this set of CCEs. We know the current PDCCH design is then sufficient to handle this range of SINR. The CCEs in the macro cell which are power reduced do not have to be wasted, they can still be used for mobiles which are in a good RF condition and can still receive the PDCCH reliably even when the power is reduced. If needed, we can utilize a higher order CCE aggregation level to extend the range of these power reduced CCEs.

Such a CCE planning technique is not very straightforward to implement, however, even in the case of a time synchronized network, as is assumed. It is difficult because we must use different physical layer cell IDs for the macro cell and the small cell, and thus, the positions of the downlink CRS, PCFICH, and PHICH will in general be different for the two cells. Because the REGs are defined to step around the locations of these channels, the REGs corresponding to a particular CCE index may only partially overlap or not overlap at all in two cells with different physical layer cell IDs. This misalignment is illustrated by diagram 400 of FIG. 4.

The most straightforward solution then is to carefully choose the physical layer cell IDs such that the positions of the downlink CRS, PCFICH, and PHICH align perfectly between the macro cell and the small cell. For example, when adding low-power small cells in an existing macro network, we would choose the physical layer cell ID of the small cell based on the existing physical layer cell ID of the macro cell into which it is being placed.

In order for the CCE locations to perfectly align between two cells, the following 4 modulo operations must produce the same value for the two different physical layer cell IDs ($N^{cell}_{ID}$) being considered, according to the equations given in TS 36.211 for the case of 2 transmit antennas at the eNB:

1. For the CRS position to be the same: $N^{cell}_{ID}$ mod 3
2. For the PCFICH position to be the same: $N^{cell}_{ID}$ mod $2N^{RB}_{DL}$
    where $N^{RB}_{DL}$ is the total number of physical resource blocks in the downlink
3. For the PHICH position to be the same: $N^{cell}_{ID}$ mod $n_0$
    where $n_0$ is the total number of REGs not assigned to PCFICH
4. For the PDCCH positions to be the same: $N^{cell}_{ID}$ mod ($9N_{CCE}$)
    where $N_{CCE}$ is the number of CCEs available for PDCCH, which depends on the number of REGs consumed by the PHICH and PCFICH.

For a given system configuration, all of these values are known. For example, in a 10 MHz LTE carrier with 2 transmit antenna ports and 7 PHICH groups configured, we have $N^{RB}_{DL}=50$, $n_0=121$, $N_{CCE}=41$.

So given the physical layer cell ID being used for the macro cell, we would search through the remaining 503 physical layer cell IDs (there are a total of 504 defined in the standard) to find one which gives the same value as the macro cell physical layer cell IDs for the 4 quantities above. We would need to remove from consideration the physical layer cell IDs being used for any other macro cells in the vicinity (the neighboring macro cells) to prevent any confusion between cell IDs for the UE.

Depending on the value of the parameters, it may not be possible to find a physical layer cell ID which satisfies the 4 points above (in which case, the CCEs will not perfectly align between the macro cell and the small cell). In that case, we propose that the physical layer cell ID of the small cell be chosen so as to maximize the number of overlapping REs between the REGs which form the CCEs. That is, we could search all possible remaining physical layer cell IDs (excluding the macro cell physical layer cell ID and the physical layer cell IDs of the neighboring macro cells) and choose the one which results in the highest number of common REs between CCEs. In this way, there will still be some partial interference suppression through the power restricted CCE planning proposed in this approach.

There are also scenarios where the small cell may cause interference to a mobile which is connected to the macro cell network. This happens when a closed subscriber group (CSG) technique is used where only certain users are allowed to connect to the small cell; this may be used for example where the small cell is a femto-cell which is serving only authorized users in a home or business. For example, a user which does not belong to the CSG may be close to the small cell but connected to the macro cell. In this case the small cell is the interferer, and the downlink received power from the small cell could be much larger than that from the macro cell for the user located close to the small cell. To address this, it is proposed that we restrict the downlink transmit PSD level over certain CCEs in the small cell, which are different from the CCEs which are power restricted on the macro cell, so as to create a group of low interference CCEs which can be utilized both for users who are connected to the macro cell and experiencing high interference from the small cell and for users who are connected to the small cell and experiencing high interference from the macro cell.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Figure 5:
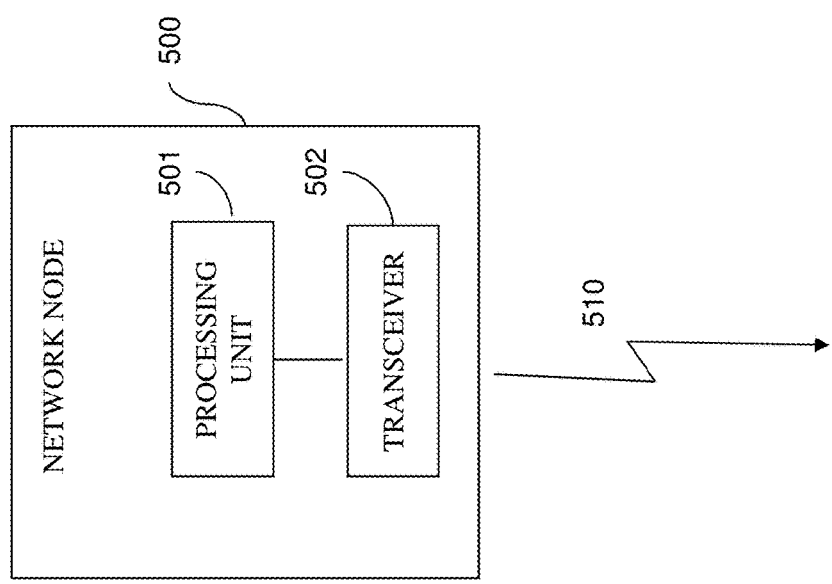
FIG. 5 is a block diagram depiction of a network node in accordance with various embodiments of the present invention.

Having described certain embodiments in detail above, a review of the more general aspects common to many of the embodiments of the present invention can be understood with reference to FIG. 5. FIG. 5 is a block diagram depiction of a network node 500 in accordance with various embodiments of the present invention.

Network node 500 includes transceiver 502 and processing unit 501, communicatively coupled to transceiver 502. Those skilled in the art will recognize that the depiction of network node 500 in FIG. 5 does not show all of the components necessary to operate in a commercial communications system but only those components and logical entities particularly relevant to the description of embodiments herein. For example, network nodes are known to comprise processing units, network interfaces, and wireless transceivers. In general, such components are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, network node 500, for example, represents known devices that have been adapted, in accordance with the description herein, to implement multiple embodiments of the present invention. Furthermore, those skilled in the art will recognize that aspects of the present invention may be implemented in and/or across various physical components and none are necessarily limited to single platform implementations.

In the example, of FIG. 5, processing unit 501 is configured to transmit via transceiver 502 a downlink 510. In particular, processing unit 501 is configured to transmit downlink signaling at a primary power spectral density (PSD) level and to also transmit, via transceiver 502, a group of control channel elements (CCEs) on a physical downlink control channel (PDCCH) at a reduced PSD level, the reduced PSD level being less than the primary PSD level.

There are many embodiments in which network node 500 is modified to various degrees. For example, depending on the embodiment, network node 500 may be either a small cell network node or a macro cell network node. In most of the embodiments in which the network node is a macro cell network node, a coverage area of the macro cell network node overlaps with a coverage area of a small cell network node. In addition, resource element groups (REGs) of the PDCCH are aligned with PDCCH REGs of the small cell network node (or aligned to a maximum extent allowed by system configuration parameters). Depending on the embodiment, the reduced PSD level is the primary PSD level reduced by a difference in transmit power between the macro cell network node and the small cell network node.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method of implementing a small cell in a heterogeneous network that includes a plurality of macro cells, the method comprising:
   identifying a first cell identifier (ID) for a macro cell having an overlapping coverage area with the small cell, wherein a network node for the macro cell operates at a primary Power Spectral Density (PSD) level;
   selecting a second cell ID from a plurality of available cell IDs for the small cell such that positions of Common Reference Symbols (CRS) for Physical Downlink Control Channel (PDCCH) transmissions of the small cell align with CRS for PDCCH transmissions of the macro cell, wherein Resource Element Groups (REGs) of the PDCCH transmissions of the macro cell align with REGs of the PDCCH transmissions of the small cell even though the second cell ID for the small cell is different than the first cell ID of the macro cell; and
   transmitting, by the network node of the macro cell, a subset of Control Channel Elements (CCEs) on the PDCCH transmissions of the macro cell at a reduced PSD level that is less than the primary PSD level to reduce interference with the small cell.

2. The method of claim 1 wherein selecting the second cell ID further comprises:
   selecting among the plurality of available cell IDs that satisfy the following equation: $N^{cell}_{ID}$ MOD 3, where $N^{cell}_{ID}$ is a cell ID of the plurality of available cell IDs.

3. The method of claim 1 wherein selecting the second cell ID comprises:
   selecting the second cell ID from the plurality of available cell IDs for the small cell such that positions of a Physical Common Format Indicator Channel (PCFICH) for the PDCCH transmissions of the small cell align with PCFICH for PDCCH transmissions of the macro cell.

4. The method of claim 3 wherein selecting the second cell ID from the plurality of available cell IDs for the small cell such that positions of the PCFICH for the PDCCH transmissions of the small cell align with the PCFICH for the PDCCH transmissions of the macro cell comprises:
   selecting among the plurality of available cell IDs that satisfy the following equation: $N^{cell}_{ID}$ MOD $2N^{RB}_{DL}$, where $N^{RB}_{DL}$ is a total number of physical Resource Blocks (RB) used in a downlink.

5. The method of claim 4 wherein selecting the second cell ID further comprises:
   selecting the second cell ID from the plurality of available cell IDs for the small cell such that positions of a Physical Hybrid Automatic Repeat Request Indicator Channel (PHICH) for the PDCCH transmissions of the small cell align with PHICH for PDCCH transmissions of the macro cell.

6. The method of claim 5 wherein selecting the second cell ID from the plurality of available cell IDs for the small cell such that positions of the PHICH for the PDCCH transmissions of the small cell align with the PHICH for the PDCCH transmissions of the macro cell comprises:
   selecting among the plurality of available cell IDs that satisfy the following equation: $N^{cell}_{ID}$ MOD $n_0$, where $n_0$ is a total number of REGs not assigned to the PCFICH for the PDCCH transmissions of the small cell.

7. The method of claim 6 wherein selecting the second cell ID further comprises:
   selecting among the plurality of available cell IDs that satisfy the following equation: $N^{cell}_{ID}$ MOD $(9N_{CCE})$, where $N_{CCE}$ is the number of CCEs available for the PDCCH transmissions of the small cell.

8. The method of claim 1 wherein selecting the second cell ID further comprises:

removing from consideration for the second cell ID, any cell IDs from the plurality of available cell IDs that are assigned to neighboring macro cells.

9. The method of claim 1 further comprising:
if the second cell ID is not found such that the CRS for the PDCCH transmissions of the small cell align perfectly with the CRS for the PDCCH transmissions of the macro cell, then selecting a third cell ID from the plurality of available cell IDs that maximizes the number of Resource Elements (REs) of the PDCCH transmissions of the small cell that overlap with REs of the PDCCH transmissions of the macro cell.

10. The method of claim 1 wherein:
the reduced PSD level is the primary PSD level reduced by a difference in transmit power between the macro cell and the small cell.

11. A non-transitory computer readable medium that stores a software program for implementing a small cell in a heterogeneous network that includes a plurality of macro cells, which when executed by one or more processors, performs the following steps:
identifying a first cell identifier (ID) for a macro cell having an overlapping coverage area with the small cell, wherein a network node for the macro cell operates at a primary Power Spectral Density (PSD) level;
selecting a second cell ID from a plurality of available cell IDs for the small cell such that positions of Common Reference Symbols (CRS) for Physical Downlink Control Channel (PDCCH) transmissions of the small cell align with CRS for PDCCH transmissions of the macro cell, wherein Resource Element Groups (REGs) of the PDCCH transmissions of the macro cell align with REGs of the PDCCH transmissions of the small cell even though the second cell ID for the small cell is different than the first cell ID of the macro cell; and
transmitting, by the network node of the macro cell, a subset of Control Channel Elements (CCEs) on the PDCCH transmissions of the macro cell at a reduced PSD level that is less than the primary PSD level to reduce interference with the small cell.

12. The computer readable medium of claim 11 wherein selecting the second cell ID comprises:
selecting among the plurality of available cell IDs that satisfy the following equation: $N^{cell}_{ID}$ MOD 3, where $N^{cell}_{ID}$ is a cell ID of the plurality of available cell IDs.

13. The computer readable medium of claim 11 wherein selecting the second cell ID further comprises:
selecting the second cell ID from the plurality of available cell IDs for the small cell such that positions of a Physical Common Format Indicator Channel (PCFICH) for the PDCCH transmissions of the small cell align with PCFICH for PDCCH transmissions of the macro cell.

14. The computer readable medium of claim 13 wherein selecting the second cell ID from the plurality of available cell IDs for the small cell such that positions of the PCFICH for the PDCCH transmissions of the small cell align with the PCFICH for the PDCCH transmissions of the macro cell comprises:
selecting among the plurality of available cell IDs that satisfy the following equation: $N^{cell}_{ID}$ MOD $2N^{RB}_{DL}$, where $N^{RB}_{DL}$ is a total number of physical Resource Blocks (RB) used in a downlink.

15. The computer readable medium of claim 14 wherein selecting the second cell ID further comprises:
selecting the second cell ID from the plurality of available cell IDs for the small cell such that positions of a Physical Hybrid Automatic Repeat Request Indicator Channel (PHICH) for the PDCCH transmissions of the small cell align with PHICH for PDCCH transmissions of the macro cell.

16. The computer readable medium of claim 15 wherein selecting the second cell ID from the plurality of available cell IDs for the small cell such that positions of the PHICH for the PDCCH transmissions of the small cell align with the PHICH for the PDCCH transmissions of the macro cell comprises:
selecting among the plurality of available cell IDs that satisfy the following equation: $N^{cell}_{ID}$ MOD $n_0$, where $n_0$ is a total number of REGs not assigned to the PCFICH for the PDCCH transmissions of the small cell.

17. The computer readable medium of claim 16 wherein selecting the second cell ID further comprises:
selecting among the plurality of available cell IDs that satisfy the following equation: $N^{cell}_{ID}$ MOD ($9N_{CCE}$), where $N_{CCE}$ is the number of CCEs available for the PDCCH transmissions of the small cell.

18. The computer readable medium of claim 11 wherein selecting the second cell ID further comprises:
removing from consideration for the second cell ID, any cell IDs from the plurality of available cell IDs that are assigned to neighboring macro cells.

19. The computer readable medium of claim 11 wherein the one or more processors perform the step of:
if the second cell ID is not found such that CRS for the PDCCH transmissions of the small cell align perfectly with the CRS for the PDCCH transmissions of the macro cell, then selecting a third cell ID from the plurality of available cell IDs that maximizes the number of Resource Elements (REs) of the PDCCH transmissions of the small cell that overlap with REs of the PDCCH transmissions of the macro cell.

20. The computer readable medium of claim 11 wherein:
the reduced PSD level is the primary PSD level reduced by a difference in transmit power between the macro cell and the small cell.

* * * * *